United States Patent [19]

Sawada et al.

[11] Patent Number: 4,567,116
[45] Date of Patent: Jan. 28, 1986

[54] MAGNETIC RECORDING MEDIUM

[75] Inventors: Takeshi Sawada, Yokohama; Akira Shinmi, Kawasaki; Hiroshi Takagi, Yokohama; Kenji Suzuki; Fumio Kishi, both of Kawasaki; Susumu Kozuki, Tokyo, all of Japan

[73] Assignees: Canon Kabushiki Kaisha, Tokyo; Tohoku Steel Co., Ltd., Miyagi, both of Japan

[21] Appl. No.: 635,234

[22] Filed: Jul. 27, 1984

[30] Foreign Application Priority Data

Aug. 6, 1983 [JP] Japan .................................. 58-144111
Aug. 6, 1983 [JP] Japan .................................. 58-144112
Aug. 6, 1983 [JP] Japan .................................. 58-144113

[51] Int. Cl.$^4$ ............................................ G11B 5/64
[52] U.S. Cl. ................................ 428/694; 204/192 M; 427/132; 427/128; 428/900; 360/134; 360/135; 360/136

[58] Field of Search ............... 428/693, 458, 694, 695, 428/900, 457; 427/132, 128; 204/192 M; 360/134–136

[56] References Cited

U.S. PATENT DOCUMENTS

| | | | |
|---|---|---|---|
| 3,206,325 | 9/1965 | Averbach | 427/132 |
| 4,087,582 | 5/1978 | Shinahata | 427/132 |
| 4,407,901 | 10/1983 | Miyatsuka | 428/694 |
| 4,439,486 | 3/1984 | Yamada | 428/694 |

Primary Examiner—Ellis P. Robinson
Attorney, Agent, or Firm—Fitzpatrick, Cella, Harper & Scinto

[57] ABSTRACT

A magnetic recording medium having a magnetic layer formed by a thin film deposition method, characterized in that the magnetic layer contains Fe as the principal component, Co, Ni and at least one of Mn, Cu, V, Nb, Ta, Mo, W, Ti, Zr and Hf.

15 Claims, 4 Drawing Figures

MAGNETIC RECORDING MEDIUM

BACKGROUND OF THE INVENTION

1. Field of the Invention

The present invention relates to magnetic recording media formed by thin film deposition methods, and specially to magnetic recording media excellent in corrosion resistance.

2. Description of the Prior Art

In recent years, the research and development of magnetic recording media have become active on the production thereof by thin film deposition methods such as vacuum deposition, sputtering, and plating methods. These methods fullfil the requirements of high density recording to a great extent in that (1) the resulting recording media exhibit high residual magnetic flux density, (2) magnetic recording media have strong coercive force can be formed, and (3) thin magnetic recording layers can be formed. Alloys constituted principally of Co and Ni have hitherto been used as magnetic materials for those recording media. In particular, a Co-20 wt. % Ni alloy has been studied extensively. Reasons for this, generally considered, are that; this alloy has relatively high corrosion resistance; such alloys containing 70 wt. % or more of Co have h.c.p. structure (hexagonal close-packed structure); and the magnetic field anisotropy thereof can be controlled with ease to excellent in-plane anisotropy.

However, this kind of alloy is very expensive because of the Co content as high as 70% or more, usually about 80%. An additional problem is that the price of Co much varies with the international situation. The corrosion resistance of these alloys also is unsatisfactory under harsh environmental condition.

SUMMARY OF THE INVENTION

Accordingly, it is the primary object of this invention to provide magnetic recording media free of the above noted drawbacks, in other words, magnetic recording media which can be supplied stably at low costs and are superior in magnetic characteristics and corrosion resistance.

The first magnetic recording medium of the invention is characterized in that the magnetic layer thereof contains Fe as the principal component, Co, Ni and at least one of Mn and Cu. This magnetic layer can be formed by any of the induction-heating vapor deposition, resistance-heating vapor deposition, electron-beam vapor deposition, sputtering, ion plating, and electroplating or electroless plating methods. It has been found that a magnetic alloy equivalent or superior to the conventional Co-Ni alloy in magnetic characteristics can be obtained by replacing a part of Co thereof with Fe so that the sum of Co and Fe contents will amount to at least 60 wt. % and Fe will become the principal component. The corrosion resistance, although lowered in general by such replacement of Co with Fe, can be rather improved to a level higher than that of the conventional Co-Ni alloy by the simultaneous addition of one of Mn and Cu or both of them without impairing any of the magnetic performance characteristics.

The second magnetic recording medium of the invention is characterized in that the magnetic layer thereof contains Fe as the principal component, Co, Ni and at least one of V, Nb, Ta, Mo and W. This magnetic layer also can be formed by various thin film deposition methods as mentioned above. Also in this case, a magnetic alloy equivalent or superior to the conventional Co-Ni alloy in magnetic characteristics can be obtained by replacing a part of Co thereof with Fe so that the sum of Co and Fe contents will amount to at least 60% by weight and Fe will become the principal component. Moreover the corrosion resistance can be improved to a level higher than that of the conventional Co-Ni alloy by the simultaneous addition of one or more of V, Nb, Ta, Mo and W in suitable proportions, without impairing any of the magnetic performance characteristics.

The third magnetic recording medium of the invention is characterized in that the magnetic layer thereof contains Fe as the principal component, Co, Ni and at least one of Ti, Zr and Hf. This magnetic layer also can be formed by various thin film deposition methods as mentioned above. Also in this case, a magnetic alloy equivalent or superior to the conventional Co-Ni alloy in magnetic characteristics by replacing a part of Co thereof with Fe so that the sum of Co anf Fe contents will amount to at least 60% by weight and Fe will become the principal component. Moreover the corrosion resistance can be improved to a level higher than that of the conventional Co-Ni alloy by the simultaneous addition of at least one of Ti, Zr and Hf without imparing any of the magnetic performance characteristics.

According to the present invention, there is provided a magnetic recording medium having a magnetic layer formed by a thin film deposition method, characterized in that the magnetic layer contains Fe as the principal component, Co, Ni and at least one of Mn, Cu, V, Nb, Ta, Mo, W, Ti, Zr and Hf.

DETAILED DESCRIPTION OF THE EMBODIMENTS OF THE INVENTION

Figure 1:
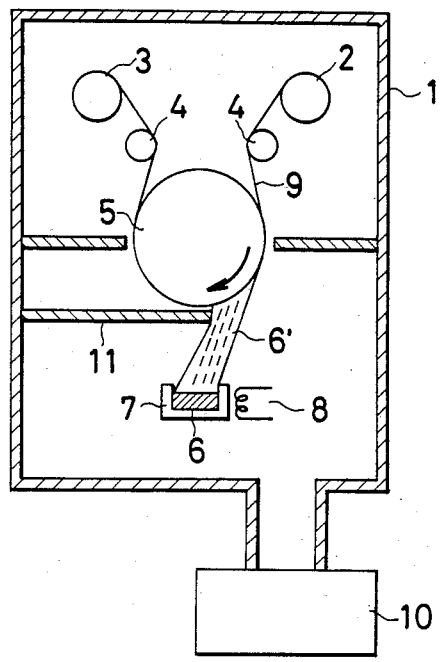
FIG. 1 is an illustration of the apparatus used in the invention for producing vapor deposition tapes.

In the magnetic materials used in the invention, Fe acts to enhance the magnetic movement per atom and increase the residual magnetic flux density Br as well as improve the ductility and prevent the occurrence of crack or flaw in the magnetic layer. On the other hand, the increasing Fe content results in rapid deterioration of the corrosion resistance as stated above and rather lowers the effect of increasing the residual magnetic flux density Br. Ni in the magnetic materials acts to improve the corrosion resistance and the ductility and prevent the occurrence of crack or flaw in the magnetic layer. Mn and Cu, when added singly or in combination, improve the corrosion resistance and abrasion resistance of the magnetic layer and further contribute to strengthen the adhesion of the magnetic layer to base films or other supporting materials. However, the addition of too much Mn and/or Cu deteriorates magnetic characteristics of the magnetic layer, for instance, loweres the Br.

Thus, suitable compositions of the magnetic layer in the first magnetic recording medium are represented by the formula

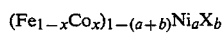

wherein, X denotes Mn and/or Cu, x denotes a weight fraction satisfying $0<x<0.5$, a denotes a weight fraction satisfying $0.05<a<0.25$, and b denotes a weight fraction satisfying $0.01<b<0.20$. Particularly suitable contents of the components are 2-10 wt. % of Mn and/or Cu, 8-20 wt. % of Ni, 15-40 wt. % of Co, and the remainder Fe. Moreover, the best suited contents are 2-9 wt. % of Mn and/or Cu, 10-16 wt. % of Ni, 20-30 wt. % of Co, and the remainder Fe.

The corrosion resistance and abrasion resistance of the magnetic layer are also improved by addition of at least one of V, Nb, Ta, Mo and W instead of Mn and/or Cu. Also in this case, too layer amounts of these elements deteriorate magnetic characteristics of the magnetic layer, for instance, lowers the Br.

Thus, suitable compositions of the magnetic layer in the second magnetic recording medium are represented by the formula $$(Fe_{1-x}Co_x)_{1-(a+b)}Ni_aY_b$$

wherein Y denotes at least one of V, Nb, Ta, Mo and W, x denotes a weight fraction satisfying $0<x\leq0.5$, a denotes a weight fraction satisfying $0.05\leq a\leq0.25$, and b denotes a weight fraction satisfying $0.005\leq b\leq0.12$. Particularly suitable contents of the components are 2-10 wt. % of at least one of V, Nb, Ta, Mo and W, 8-20 wt. % of Ni, 15-40 wt. % of Co, and the remainder Fe. The most suitable contents thereof are 2-9 wt. % of at least one of these elements, 10-16 wt. % of Ni, 20-30 wt. % of Co, and the remainder Fe.

The addition of at least one of Ti, Zr and Hf is also effective in improving the corrosion resistance and abrasion resistance of the magnetic layer. Additionally these elements contribute to strengthen the adhesion of the magnetic layer to base films or other supporting materials. Also in this case, too large amounts of these elements deteriorate magnetic characteristics of the magnetic layer, for instance, lowers the Br.

Thus, suitable compositions of the magnetic layer in the third magnetic recording medium are represented by the formula $$(Fe_{1-x}Co_x)_{1-(a+b)}Ni_aZ_b$$

wherein, Z denotes at least one of Ti, Zr and Hf, x denotes a weight fraction satisfying $0<x\leq0.5$, a denotes a weight fraction satisfying $0.05\leq a\leq0.25$, and b denotes a weight fraction satisfying $0.01\leq b\leq0.12$. Particularly suitable contents of the components are 2-8 wt. % of at least one of Ti, Zr and Hf, 8-20 wt. % of Ni, 15-40 wt/% of Co, and the remainder Fe. The most suitable contents thereof are 3-6 wt. % of at least one of Ti, Zr and Hf, 10-16 wt. % of Ni, 20-30 wt/% of Co, and the remainder Fe.

The invention is illustrated further referring to the following example:

FIG. 1 shows the apparatus used in the invention for producing vapor deposition tapes, which belong to a category of magnetic recording media. In a vacuum chamber 1 thereof, there are arranged a film wind-out reel 2, winding reel 3, intermediate free rollers 4, cooling drum 5, vessel 7 containing a feedstock 6 for vapor deposition, and electron beam generator 8. A continuous poly (ethylene terephthalate) film 9 100 mm wide and 15μ thick is taken off from the wind-out reel 2 and passed through the free roller 4, the cooling drum 5, and the second free roller 4 to the winding reel 3. The feedstock 6 contained in the vessel 7 opposing to the cooling drum 5 is heated with an electron beam from the electron beam generator 8. The heated feedstock forms a vapor stream 6' and then adheres onto the film 9 running on the cooling drum 5, thus forming a magnetic layer. The incident angle of the vapor stream 6' falling upon the film 9 is restricted by a baffle 11 to 60°-90° and, accordingly, such a deposition process is known to the art as an oblique incidence deposition method.

The vacuum chamber 1 was kept at a vacuum of $1\times10^{-4}-5\times10^{-6}$ Torr during the film formation by operating an evacuating system 10. The film speed was 10 m/min and the thickness of the completed magnetic layer was about 1000Å.

Tables 1-8 show compositions of the magnetic layers of thus prepared vapor deposition tapes and results of corrosion tests on the tapes. In the corrosion tests, specimens of each prepared tape were allowed to stand for 1000 hours in a therm-hygrostat at 60° C. and 90% R.H., and then the change in the residual magnetic flux density Br was measured.

In Tables 1-8, the marks 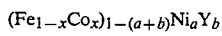, 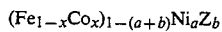 and X indicate Br drops of less than 5%, 5-10%, and more than 10%, respectively.

TABLE 1

| Tape No. | content (wt. %) | | | | | Corrosion resistance |
|---|---|---|---|---|---|---|
| | Fe | Co | Ni | Cu | Mn | |
| 1 | 61 | 24 | 15 | 0 | 0 | X |
| 2 | 51 | 28 | 14 | 0 | 7 | |
| 3 | 55 | 23 | 14 | 8 | 0 | |
| 4 | 10 | 65 | 21 | 0 | 4 | |
| 5 | 64 | 18 | 8 | 0 | 10 | |
| 6 | 60 | 15 | 15 | 3 | 7 | |
| 7 | 64 | 20 | 7 | 5 | 4 | |
| 8 | 0 | 80 | 20 | 0 | 0 | X |

TABLE 2

| Tape No. | Content (wt. %) | | | | Corrosion resistance |
|---|---|---|---|---|---|
| | Fe | Co | Ni | V | |
| 9 | 61 | 24 | 15 | 0 | X |
| 10 | 60 | 24 | 14 | 2 | X |
| 11 | 59 | 24 | 13 | 4 | |
| 12 | 56 | 21 | 13 | 10 | |
| 13 | 0 | 80 | 20 | 0 | |

TABLE 3

| Tape No. | Content (wt. %) | | | | Corrosion resistance |
|---|---|---|---|---|---|
| | Fe | Co | Ni | Nb | |
| 14 | 60 | 23 | 16 | 1 | X |
| 15 | 59 | 25 | 13 | 3 | |
| 16 | 55 | 23 | 12 | 10 | |

TABLE 4

| Tape No. | Content (wt. %) | | | | Corrosion resistance |
|---|---|---|---|---|---|
| | Fe | Co | Ni | Ta | |
| 17 | 61 | 25 | 13 | 1 | X |
| 18 | 60 | 23 | 14 | 3 | X |
| 19 | 57 | 24 | 14 | 5 | |
| 20 | 55 | 22 | 12 | 11 | |

TABLE 5

| Tape No. | Content (wt. %) | | | | Corrosion resistance |
|---|---|---|---|---|---|
| | Fe | Co | Ni | Mo | |
| 21 | 60 | 24 | 15 | 1 | X |

TABLE 5-continued

| Tape No. | Content (wt. %) | | | | Corrosion resistance |
|---|---|---|---|---|---|
| | Fe | Co | Ni | Mo | |
| 22 | 60 | 24 | 13 | 3 | |
| 23 | 57 | 23 | 13 | 7 | |

TABLE 6

| Tape No. | Content (wt. %) | | | | Corrosion resistance |
|---|---|---|---|---|---|
| | Fe | Co | Ni | W | |
| 24 | 61 | 25 | 13 | 1 | X |
| 25 | 59 | 24 | 14 | 3 | |
| 26 | 54 | 23 | 13 | 10 | |

TABLE 7

| Tape No. | Content (wt. %) | | | | | | | Corrosion resistance |
|---|---|---|---|---|---|---|---|---|
| | Fe | Co | Ni | V | Nb | Ta | Mo | W | |
| 27 | 57 | 24 | 13 | 3 | 0 | 2 | 0 | 1 | |
| 28 | 56 | 24 | 12 | 2 | 3 | 0 | 3 | 0 | |

TABLE 8

| Tape No. | Content (wt. %) | | | | | | Corrosion resistance |
|---|---|---|---|---|---|---|---|
| | Fe | Co | Ni | Ti | Zr | Hf | |
| 29 | 61 | 24 | 15 | 0 | 0 | 0 | X |
| 30 | 70 | 17 | 11 | 2 | 0 | 0 | |
| 31 | 58 | 27 | 13 | 2 | 0 | 0 | |
| 32 | 56 | 25 | 12 | 7 | 0 | 0 | |
| 33 | 57 | 29 | 12 | 0 | 2 | 0 | |
| 34 | 55 | 26 | 13 | 0 | 6 | 0 | |
| 35 | 57 | 27 | 14 | 0 | 0 | 2 | |
| 36 | 56 | 26 | 14 | 0 | 0 | 4 | |
| 37 | 60 | 21 | 13 | 2 | 2 | 2 | |

Figure 2:
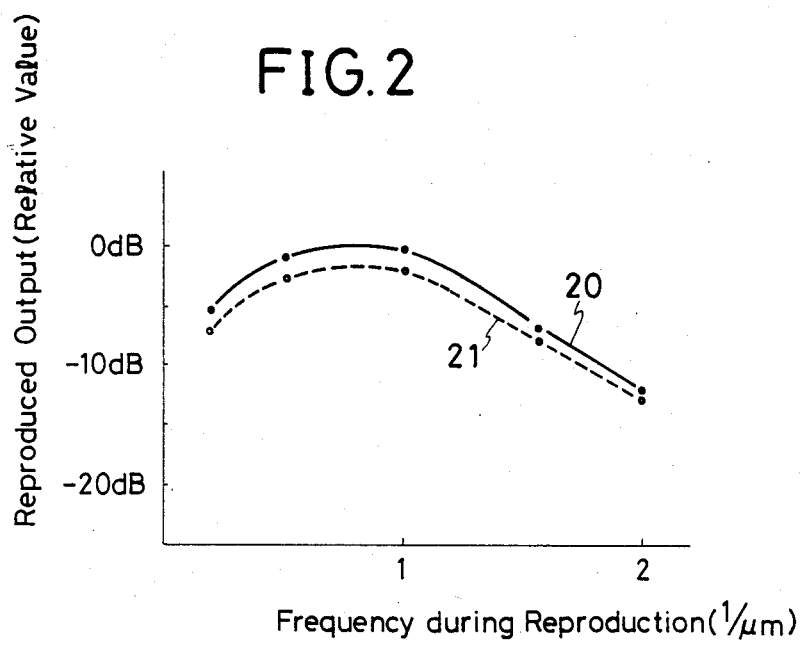
FIGS. 2, 3 and 4 are graphs showing reproduced outputs at different frequencies in playback tests of tapes No.7 (see Table 1), No.11 (see Table 2) and No.32 (see Table 8) as compared with tape Nos. 8 and 13 (Co-20 Wt. % Ni tapes of conventional type), respectively.
Figure 3:
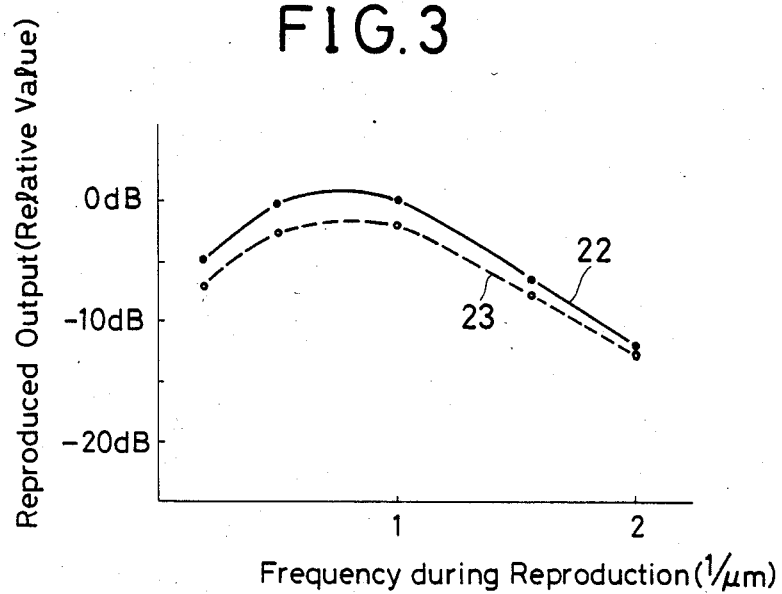
Figure 4:
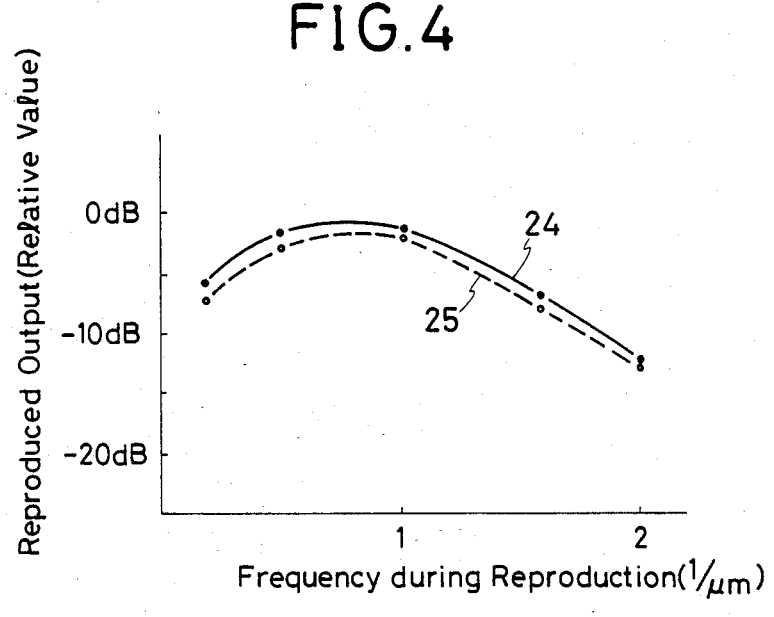

FIGS. 2, 3 and 4 show reproduction power outputs given by certain tapes prepared in this example when these were used in a home video deck. In these graphs, curves 20, 22 and 24 were given by tape Nos. 7, 11 and 32, respectively, which are recording tapes according to this invention, and curves 21, 23 and 25 were given by tape No. 8, which is a conventional Co-20 wt. % Ni type of tape prepared for comparison under the same conditions. Tape No. 7, 11 and 32 of the invention gave reproduction power outputs equivalent and up to 2 dB higher than those given the conventional Co-Ni tape. Tape Nos. 2, 3, 5, 6, 15, 19, 22, 25, 27 and so forth, which are recording media according to this invention, also gave reproduction power outputs higher than those given by the Co-Ni type of tape.

While tape No.4 was equivalent in reproduction power outputs and superior in corrosion resistance to the Co-Ni type of tape, the material cost reduction, which is an object of the invention, can be hardly achieved with tape No.4 since a small amount of Co was replaced by Fe in this case.

As illustrated above, the magnetic recording media of the invention, since Fe is the principal component of the magnetic layer, are produced at very low costs as compared with the conventional magnetic media of Co-Ni alloy type wherein Co is the principal component.

Moreover, the magnetic recording media of the invention are greatly improved in corrosion resistance as compared with the media of the magnetic layer made of Fe as the principal component and Co and Ni, which has the drawback of low corrosion resistance, by additional incorporation of at least one of Mn, Cu, V, Nb, Ta, Mo, W, Ti, Zr and Hf. Further, the magnetic recording media of the present invention are equivalent or superior to the Co-20 wt. % Ni alloy type media in reproduction power output and corrosion resistance.

What we claim is:

1. A magnetic recording medium having a thin ferromagnetic corrosion resistant metallic film formed by an oblique incidence deposition method, characterized in that a composition of the thin ferromagnetic metallic film is represented by the formula $$(Fe_{1-x}Co_x)_{1-(a+b)}Ni_aX_b$$

wherein, X denotes Mn and/or Cu, x denotes a weight fraction satisfying $0<x<0.5$, a denotes a weight fraction satisfying $0.05<a<0.25$, and b denotes a weight fraction satisfying $0.01<b<0.20$.

2. The magnetic recording medium according to claim 1, wherein the composition of the thin ferromagnetic metallic film contains 2-10 wt. % of Mn and/or Cu, 8-20 wt. % of Ni, 15-40 wt. % of Co and the remainder of Fe.

3. The magnetic recording medium according to claim 1, wherein the composition of the thin ferromagnetic metallic film contains 2-9 wt. % of Mn and/or Cu, 10-16 wt. % of Ni, 20-30 wt. % of Co, and the remainder of Fe.

4. A magnetic recording medium having a thin ferromagnetic corrosion resistant metallic film formed by an oblique incidence deposition method, characterized in that a composition of the thin ferromagnetic metallic film is represented by the formula $$(Fe_{1-x}Co_x)_{1-(a+b)}Ni_aY_b$$

wherein, Y denotes at least one of V, Nb, Ta, Mo and W, x denotes a weight fraction satisfying $0<x\leq0.5$, a denotes a weight fraction satisfying $0.05\leq a\leq 0.25$, and b denotes a weight fraction satisfying $0.005\leq b\leq 0.12$.

5. The magnetic recording medium according to claim 4, wherein the composition of the thin ferromagnetic metallic film contains 2-10 wt. % of at least one of V, Nb, Ta, Mo and W, 8-20 wt. % of Ni, 15-40 wt. % of Co, and the remainder of Fe.

6. The magnetic recording medium according to claim 4, wherein the composition of the thin ferromagnetic metallic film contains 2-9 wt. % of at least one of V, Nb, Ta, Mo and W, 10-16 wt. % of Ni, 20-30 wt. % of Co, and the remainder of Fe.

7. A magnetic recording medium having a thin ferromagnetic corrosion resistant metallic film formed by an oblique incidence deposition method, characterized in that a composition of the thin ferromagnetic metal film layer is represented by the formula $$(Fe_{1-x}Co_x)_{1-(a+b)}Ni_aZ_b$$

wherein Z denotes at least one of Ti, Zr and Hf, x denotes a weight fraction satisfying $0<x\leq0.5$, a denotes a weight fraction satisfying $0.05\leq a\leq 0.25$, and b denotes a weight fraction satisfying $0.01\leq b\leq 0.12$.

8. The magnetic recording medium according to claim 7, wherein the composition of the thin ferromagnetic metallic film contains 2-8 wt. % of at least one of Ti, Zr and Hf, 8-20 wt. % of Ni, 15-40 wt. % of Co, and the remainder of Fe.

9. The magnetic recording medium according to claim 7, wherein the composition of the thin ferromagnetic metallic film contains 3-6 wt. % of at least one of Ti, Zr, and Hf, 10-16 wt. % of Ni, 20-30 wt. % of Co, and the remainder of Fe.

10. The magnetic recording medium according to claim 1, wherein the composition of the thin ferromagnetic metallic film contains 50-60 wt. % of Fe.

11. The magnetic recording medium according to claim 1, wherein the composition of the thin ferromagnetic metallic film contains 54-60 wt. % of Fe.

12. The magnetic recording medium according to claim 4, wherein the composition of the thin ferromagnetic metallic film contains 50-60 wt. % of Fe.

13. The magnetic recording medium according to claim 4, wherein the composition of the thin ferromagnetic metallic film contains 54-60 wt. % of Fe.

14. The magnetic recording medium according to claim 7, wherein the composition of the thin ferromagnetic metallic film contains 50-60 wt. % of Fe.

15. The magnetic recording medium according to claim 7, wherein the composition of the thin ferromagnetic metallic film contains 54-60 wt. % of Fe.

* * * * *

UNITED STATES PATENT AND TRADEMARK OFFICE
CERTIFICATE OF CORRECTION

PATENT NO. : 4,567,116

DATED : January 28, 1986

INVENTOR(S) : Takeshi Sawada, et al.

It is certified that error appears in the above-identified patent and that said Letters Patent is hereby corrected as shown below:

Column 1, line 18, "have" should be --having--.
Column 1, line 24, "that; this" should be --that this--.
Column 2, line 24, "imparing" should be --impairing--.
Column 3, line 13, "case, too layer" should be --case, layer--.
Column 4, line 22, "marks, and X" should be --marks ⊚, O and X--.
Column 4, Table 1, under "Corrosion resistance" the values from top to bottom should be --X,O,⊚,O,O,o,O,X--
Column 4, Table 2, under "Corrosion resistance" the values from top to bottom should be --X,X,O,⊚,O--
Column 4, Table 3, under "Corrosion resistance" the values from top to bottom should be --X,O,⊚--.
Column 4, Table 4, under "Corrosion resistance" the values from top to bottom should be --X,X,O,⊚--.
Columns 4-5, Table 5, under "Corrosion resistance" the values from top to bottom should be --X,O,⊚--.
Column 5, Table 6, under "Corrosion resistance" the values from top to bottom should be --X,O,⊚--.

UNITED STATES PATENT AND TRADEMARK OFFICE
CERTIFICATE OF CORRECTION

PATENT NO. : 4,567,116

DATED : January 28, 1986

INVENTOR(S) : Takeshi Sawada, et al.

It is certified that error appears in the above-identified patent and that said Letters Patent is hereby corrected as shown below:

Column 5, Table 7, under "Corrosion resistance" the values from top to bottom should be --O,◉--.

Column 5, Table 8, under "Corrosion resistance" the values from top to bottom should be --X,O,◉, ◉,◉,◉,◉,◉,◉--

Signed and Sealed this

Twenty-seventh Day of January, 1987

Attest:

DONALD J. QUIGG

Attesting Officer     Commissioner of Patents and Trademarks